(12) United States Patent
Umminger et al.

(10) Patent No.: US 9,597,621 B2
(45) Date of Patent: Mar. 21, 2017

(54) MULTI-PLY FILTER MEDIUM

(71) Applicant: JOHNS MANVILLE, Denver, CO (US)

(72) Inventors: Juergen Umminger, Lauda-Koenigshofen (DE); Christian Hassmann, Mittelneufnach (DE)

(73) Assignee: Johns Manville, Denver, CO (US)

( * ) Notice: Subject to any disclaimer, the term of this patent is extended or adjusted under 35 U.S.C. 154(b) by 395 days.

(21) Appl. No.: 13/684,858

(22) Filed: Nov. 26, 2012

(65) Prior Publication Data

US 2013/0153517 A1 Jun. 20, 2013

(30) Foreign Application Priority Data

Dec. 15, 2011 (DE) .................. 10 2011 121 136

(51) Int. Cl.
*B01D 39/00* (2006.01)
*B01D 39/20* (2006.01)
*B01D 39/16* (2006.01)
B01D 37/00 (2006.01)

(52) U.S. Cl.
CPC ........ *B01D 39/2024* (2013.01); *B01D 39/163* (2013.01); *B01D 39/202* (2013.01); *B01D 2239/0668* (2013.01); *B01D 2239/086* (2013.01); *B01D 2239/1233* (2013.01); *B01D 2239/1258* (2013.01); *B01D 2239/1291* (2013.01); *Y10T 156/10* (2015.01)

(58) Field of Classification Search
CPC .......................... B01D 39/2024; B01D 39/163; B01D 39/202; B01D 2239/0668; B01D 2239/086; B01D 2239/1233; B01D 2239/1258; B01D 2239/1291; Y10T 156/10
USPC .... 210/767, 500.1, 503, 504, 506, 508, 509, 210/507; 95/90, 92, 149, 214, 273, 274, 95/285
See application file for complete search history.

(56) References Cited

U.S. PATENT DOCUMENTS

| | | | | |
|---|---|---|---|---|
| 5,306,321 | A * | 4/1994 | Osendorf | B01D 39/1623 210/493.1 |
| 5,582,865 | A * | 12/1996 | Rezuke | A61L 9/046 427/180 |
| 5,800,586 | A | 9/1998 | Cusick et al. | |
| 5,993,501 | A * | 11/1999 | Cusick et al. | 55/486 |
| 2005/0193696 | A1 * | 9/2005 | Muller | B01D 46/0032 55/486 |
| 2008/0302072 | A1 * | 12/2008 | Hassmann et al. | 55/486 |
| 2010/0107881 | A1 * | 5/2010 | Healey et al. | 96/11 |
| 2011/0079553 | A1 | 4/2011 | Thomson et al. | |

FOREIGN PATENT DOCUMENTS

| | | | |
|---|---|---|---|
| EP | 2 006 009 A2 | 12/2008 | |
| JP | EP 2380651 A2 * | 10/2011 | B01D 46/523 |

* cited by examiner

*Primary Examiner* — Allison Fitzsimmons
(74) *Attorney, Agent, or Firm* — Robert D. Touslee

(57) ABSTRACT

The present invention relates to a filter composed of a multi-ply filter medium which (i) has at least one textile stiffening layer (layer 4), preferably a non-woven layer, of synthetic, polymer fibers, glass fibers or mixtures of the same, (ii) at least one filtration layer (layer 3), which is attached to at least one side of the non-woven stiffening fabric, the filtration layer being made up of glass fibers, (iii) at least one further filtration layer (layer 2), which is applied on the filtration layer according to ii), the further filtration layer being made up of glass fibers, and at least one textile cover layer (layer 1), which is applied on the filtration layer according to iii), the cover layer being made up of synthetic polymer fibers.

A further subject matter are filter modules including a housing and at least one filter medium according to the invention, and also a method for producing the filter medium according to the invention and also the filter modules and the use thereof in filtration of air/gas and liquids, preferably for filtration of air flows in supply air and/or heat exchanger systems.

21 Claims, No Drawings

MULTI-PLY FILTER MEDIUM

BACKGROUND OF THE INVENTION

The present invention relates to a filter composed of a multi-ply filter medium, a method for manufacturing said filter and the use of the filter according to the invention.

The use of filters, especially multi-ply filter media, has long been known. Air filters have long been used, for example, in the automotive industry, in air conditioning systems, passenger compartment filters, pollen filters, clean room filters, domestic filters, etc. Filters have also been used for many years in the filtration of liquid media. Examples of these include oil filters and hydraulic filters.

The filters are adapted to achieve a satisfactory filtration efficiency and service life depending on the field of application. Thus, particle air filters for general ventilation (according to EN 779) are used as coarse, medium and fine filters in air/gas filtration and for liquid filtration, whilst HEPA filters (according to EN 1822) are used in the field of EPA and HEPA (air) or water preparation.

U.S. Pat. No. 5,993,501 discloses multi-ply filter media and filters, which are composed of a stiff, pleatable base layer, the actual filtration layer and a covering. These filters are already well-suited to gas filtration (air filtration) and liquid filtration.

EP-A-1134013 discloses multi-ply pleated filter media and filters, which are composed of a stiff, pleatable base layer, the actual filtration layer and a covering. These filters are made up of polymer, fusible binder-consolidated microfibers and already well-suited to gas filtration (air filtration) and liquid filtration.

Multi-ply filter media and filters are known from EP-A-0878226, which are made up of fine polymer and glass fibers. These filters are already well-suited to gas filtration (air filtration) and liquid filtration.

Filter media and filters are known from EP-A-1656981, which are made up of fine glass fibers. These filters are already well-suited to gas filtration (air filtration) and liquid filtration.

In supply air and heat exchanger systems, it is necessary to clean the air flows present such that a good air quality and cleanliness of the system are ensured. To this end, filter systems with different separately installed filter classes are conventionally used, which leads to complex filter systems with a high space requirement. In addition, multi-component systems are connected with a higher maintenance outlay.

SUMMARY OF THE INVENTION

Thus, there is continually a requirement for further improved filters which can be used in particular in the previously mentioned supply air and heat exchanger systems and in addition to a good filter performance can be realized in a compact design.

The object of the present invention, therefore, is a filter composed of a multi-ply filter medium comprising:
- a) at least one textile stiffening layer (layer 4), preferably a non-woven layer, of synthetic, polymer fibers, glass fibers or mixtures of the same,
  - a1) the textile stiffening layer, preferably the non-woven fabric, having a weight per unit area of 10 to 300 g/m²,
  - a2) the fibers of the textile stiffening layer, preferably of the non-woven fabric, having a diameter in the range of 2 to 25 dtex for polymer fibers or a diameter of 0.5-15 μm for glass fibers,
  - a3) the textile stiffening layer, preferably the non-woven fabric, being consolidated by means of chemical binders or by means of thermoplastic binders,
  - a4) the textile stiffening layer, preferably the non-woven fabric, having an air permeability of at least 750 l/m² sec,
- b) at least one filtration layer (layer 3), which is attached to at least one side of the non-woven stiffening, the filtration layer being made up of glass fibers and
  - b1) the filtration layer made up of glass fibers being a non-woven fabric, the weight per unit area of which is between 25 and 300 g/m²,
  - b2) the glass fibers having a diameter of 0.5 μm to 2.0 μm,
  - b3) the glass fiber non-woven fabric consolidating by means of chemical binders,
  - b4) the quantity of the chemical binder applied is 5 to 20% by weight with respect to the weight per unit area of the filtration layer (layer 3),
- c) at least one further filtration layer (layer 2), which is applied on the filtration layer according to b), the filtration layer being made up of glass fibers and
  - c1) the further filtration layer made up of glass fibers being a non-woven fabric, the weights per unit area of which is between 40 and 300 g/m²,
  - c2) the glass fibers having a diameter of 2.0 μm to 5.5 μm,
  - c3) the glass fiber non-woven fabric consolidating by means of chemical binders,
  - c4) the quantity of the chemical binder applied is 5 to 20% by weight with respect to the weight per unit area of the filtration layer (layer 2),
- d) at least one textile cover layer (layer 1), which is applied on the filtration layer according to c), the cover layer being made up of synthetic polymer fibers and
  - d1) the textile cover layer, preferably the non-woven fabric, having a weight per unit area of 20 to 100 g/m²,
  - d2) the fibers of the textile cover layer, preferably of the non-woven fabric, having a diameter in the range of 2 to 25 dtex,
  - d3) the textile cover layer, preferably the non-woven fabric, being consolidated by means of chemical binders or by means of thermoplastic binders,
  - d4) the quantity of the chemical binder or thermoplastic binder applied is 5 to 25% by weight with respect to the weight per unit area of the cover layer (layer 1),
  - dx) the textile cover layer, preferably the non-woven fabric, having an air permeability of at least 2500 l/m² sec, Stiffening Layer (Layer 4) and Cover Layer (Layer 1)

Non-woven fabrics, woven fabrics, scrims, warp-knitted fabrics and knitted fabrics are used as textile stiffening layer or textile cover layer, non-woven fabrics being preferred due to their technical availability.

The textile stiffening layer used according to the invention is preferably a non-woven stiffening layer of synthetic, polymer fibers, glass fibers or mixtures thereof, which is pleatable.

The textile cover layer used according to the invention is preferably a non-woven cover layer of synthetic, polymer fibers, which is pleatable. Preferably the textile cover layer, particularly the non-woven cover layer, is made up of various synthetic polymer fibers. Furthermore, the textile cover layer, particularly the non-woven cover layer, can also be made up in a multi-ply manner. Here, the individual layers can differ with regard to the various chosen synthetic polymer fibers and/or have various fiber diameters.

The non-woven fabrics are wet non-woven fabrics, spinbonded fabrics or dry-laid non-woven fabrics, which are consolidated by means of chemical bonding as well as, if necessary, thermal and/or mechanical consolidation. The non-woven fabrics are staple fiber non-woven fabrics and/or spinbonded fabrics.

DETAILED DESCRIPTION OF THE INVENTION

The preferred embodiments for the spinbonded fabric materials described below also apply for staple fiber non-woven fabrics.

Spinbonded fabrics, that is to say so-called spunbonds, are produced by a random deposition of freshly melt-spun filaments. The filaments are continuous synthetic fibers composed of melt-spinnable polymer materials.

Suitable polymer materials are, for example, thermoplastics, preferably polyamides, such as polyhexamethylenediadipamide, polycaprolactam, aromatic or partially aromatic polyamides ("aramides"), aliphatic polyamides, such as nylon, partially aromatic or fully aromatic polyesters, polycarbonates (PC), polyphenylene sulphide (PPS), polyphenylene oxide (PPO), polystyrene (PS), polyvinyl carbazole (PVK), polyacetal (POM), polyaryl ether, polyaryl sulphone, polyether sulphone, polymers with ether and keto-groups, such as polyether ketones (PEK) and polyether etherketone (PEEK), polyolefins, such as polyethylene or polypropylene, or polybenzimidazoles. Particularly preferred are polyester, polyolefins, such as e.g. polyethylene or polypropylene, or aromatic or partially aromatic polyamides ("aramids"), aliphatic polyamides, such as e.g. nylon.

The spinbonded fabrics preferably comprise or are composed of melt-spinnable polyesters. The polyester material can, in principle, be any known type suitable for fiber production. Such polyesters consist predominantly of components derived from aromatic dicarboxylic acids and from aliphatic diols. Commonly used aromatic dicarboxylic acid components are bivalent residues of benzenedicarboxylic acids, especially of terephthalic acid and of isophthalic acid; commonly used diols have 2 to 4 carbon atoms, wherein ethylene glycol is particularly suitable. Spunbonded fabrics which consist of at least 85 mole % of polyethylene terephthalate are particularly advantageous. The remaining 15 mol % are then formed by dicarboxylic acid moieties and glycol moieties which act as so-called modifiers and allow the person skilled in the art to specifically influence the physical and chemical properties of the produced filaments. Examples of such dicarboxylic acid units are residues of isophthalic acid or of aliphatic dicarboxylic acid, such as glutaric acid, adipic acid, and sebacic acid; examples of modifying diol residues are those composed of longer-chain diols, such as propane diol or butane diol, of diethylene or triethylene glycol or, if present in small quantities, of polyglycol with a molar weight of approximately 500 to 2000.

Polyesters containing at least 95 mol % of polyethylene terephthalate (PET) are particularly preferred, especially those composed of unmodified PET.

The polyesters contained in the spinbonded fabrics preferably have a molecular weight corresponding to an intrinsic viscosity (IV) of 0.6 to 1.4, measured in a solution of 1 g polymer in 100 ml dichloroacetic acid at 25° C.

In a further embodiment of the invention, the non-woven fabric, particularly the spinbonded non-woven fabric can also be a fusible binder-consolidated non-woven fabric, i.e. the consolidation takes place by means of a thermoplastic binder which is preferably present in fiber form. The fusible binder-consolidated non-woven fabric therefore comprises carrier and hot melt adhesive fibers. The carrier and hot-melt adhesive fibers can be derived from any thermoplastic, fiber-forming polymers, carrier fibers can furthermore also be derived from non-melting fiber-forming polymers. Such fusible binder-consolidated spinbonded fabrics are fundamentally described, for example, in EP-A 0,446,822 and EP-A 0,590,629.

Examples of polymers from which the carrier fibers can be derived are polyacrylonitrile, polyolefins, such as polyethylene or polypropylene, primarily aliphatic polyamides, such as nylon 6.6, primarily aromatic polyamides (aramids), such as poly-(p-phenylene terephthalate) or copolymers containing a content of aromatic m-diamine moieties to improve the solubility, or poly-(m-phenylene isophthalate), primarily aromatic polyesters, such as poly-(p-hydroxybenzoate), or preferably primarily aliphatic polyesters, such as polyethylene terephthalate.

The relative proportion of the two fiber types may be selected within wide limits, whilst making sure that the proportion of the hot melt adhesive fibers is sufficient to bond the carrier fibers to the hot melt adhesive fibers, thereby endowing the non-woven fabric with a strength sufficient for the intended application, whilst on the other hand ensuring the necessary air permeability. The proportion of the hot-melt derived from the hot-melt fiber in the non-woven is usually less than 50% by weight (based upon the weight of the non-woven).

Modified polyesters having a melting point 10 to 50° C., preferably 30 to 50° C., lower than the raw material of the non-woven fabric are particularly suitable as hot melt adhesive. Examples of such a hot melt adhesive are polypropylene, polybutylene terephthalate, or polyethylene terephthalate modified by the condensation of longer-chain diols and/or isophthalic acid or aliphatic dicarboxylic acid.

The hot melt adhesives are preferably incorporated into the non-woven fabrics in fibrous form.

The carrier fibers and hot melt adhesive fibers are preferably made up of one class of polymers. This implies that all of the fibers used are selected from one class of substances, so that these can readily be recycled after the non-woven fabric has been used. If the carrier fibers consist of polyester, for example, the hot melt adhesive fibers selected will likewise be of polyester or a mixture of polyesters, for example in the form of bi-component fibers with PET in the core and a polyethylene terephthalate copolymer having a low melting point as sheath. In addition, however, bi-component fibers which are made up of different polymers are also possible. Examples of these are bi-component fibers of polyester and polyamide (core/sheath).

The monofilament titre of the carrier fibers and the hot melt adhesive fibers may be selected within said limits.

The filaments or staple fibers making up the non-woven fabrics may have a virtually circular cross section or may also have other shapes, such as dumb bell-shaped, reniform, triangular, trilobal or multilobal cross sections. Hollow fibers and bi-component or multi-component fibers may also be used. Furthermore, the hot-melt adhesive fiber may also be used in the form of bi-component or multi-component fibers.

The fibers forming the non-woven may also be modified by means of the usual additives, for example by antistatic agents such as carbon black, or additives which will permit an electrostatic charge. Furthermore, the fibers can have antimicrobial equipment.

In addition to the synthetic, polymer fibers mentioned, glass fibers or mixtures of glass fibers and synthetic polymer fibers are suitable as non-woven forming fibers.

Instead of the glass fibers, mineral fibers based on alumino silicate, ceramic, dolomite fibers or fibers of vulcanites, such as e.g. basalt diabase, melaphyre diabase (greenstone) and melaphyres (so-called paleobasalts) can also be used. Glass fibers are preferred however on account of their economic availability.

In the case of the glass fiber fabrics, the glass fibers used are not subject to any substantial restriction with regard to the type of glass, so that in principle all types of glass such as E glass, S glass, R glass, and C glass may be used. For economic reasons E glass or C glass is preferred. Biosoluble glasses are particularly preferred.

The glass fibers may be formed from filaments, that is to say fibers of infinite length or from staple fibers. The average length of the staple fibers is between 3 and 100 mm, preferably 6 to 18 mm.

In the case of the non-woven stiffening fabric, this can preferably also only be made up of glass fibers. Glass-fiber non-woven stiffening fabrics of this type are likewise made up of the previously described glass fibers. The non-woven fabrics may be manufactured by known wet or dry laying methods.

The weight per unit area of the textile stiffening layer, preferably the non-woven stiffening fabric layer, is between 10 and 300 $g/m^2$, preferably 20 and 250 $g/m^2$, particularly 20 and 100 $g/m^2$. If the textile stiffening layer, preferably the non-woven stiffening fabric layer, also comprises glass fibers, then the weight per unit area is between 25 and 300 $g/m^2$, preferably 35 and 110 $g/m^2$.

The mixing ratios of polymer/glass vary in wide ranges and are in each case 0-100% by weight, preferably the textile stiffening layer, preferably the textile non-woven stiffening fabric layer, is 100% glass. The diameter of the glass fibers is between 0.5-15 μm, preferably 8 to 15 μm. Particularly preferably, the non-woven stiffening fabric layer consists of glass fibers.

The weight per unit area of the textile cover layer, preferably the non-woven cover layer, is between 20 and 100 $g/m^2$, preferably 25 and 2 $g/m^2$, particularly 30 and 45 $g/m^2$.

Depending on the application profile of the filters, the spinbonded fabrics forming the non-woven stiffening fabrics or non-woven cover fabrics are also subjected after manufacture to a hydrodynamic and/or thermal consolidation in addition to the chemical consolidation.

For this purpose, the fusible binder consolidatable spinbonded fabrics, which also contain binding fibers in addition to carrier fibers, are thermally consolidated by calendering or in an oven in a manner known per se. The fibers can also have a bi-component structure (e.g. core/sheath), in which the sheath is the binder polymer.

If the spinbonded fabrics do not contain any binding fibers capable of thermal consolidation, these spinbonded fabrics are impregnated with a chemical binder. Acrylate-based or styrene-based binders are particularly suitable for this purpose. The proportion of binder is appropriately up to 25% by weight, preferably 5 to 25% by weight. The precise choice of binder is determined by the particular sphere of operations of the processing firm.

In a further embodiment flame-inhibiting modified binders can also be used, or binders can even be dispensed with altogether.

In a further embodiment of the invention the non-woven stiffening or the non-woven cover fabric has an embossed pattern statistically distributed or small, repeat embossings, preferably stippling, in which the compressed area, that is to say the totality of all thin, compacted points on the spinbonded fabric makes up 5 to 30%, preferably 8 to 20% of its total area. In the case of fusible binder-consolidated spinbonded fabrics this embossed pattern can advantageously be applied in the calander consolidation. If the non-woven stiffening is finally consolidated by a chemical binder, the embossed pattern can likewise be applied by means of a calander. This embossed pattern, which is applied to both sides of the spinbonded fabric but preferably to only one surface of the spin-bonded fabric as the spinbonded fabric runs through a heated calander, has a plurality of small embossings, 0.2 to 4 $mm^2$, preferably 0.5 to 2 $mm^2$ in size, which are separated from one another by intervening, unstamped surface elements of the fabric of approximately the same size. The area of the compressed parts of the non-woven fabric and the uncompressed parts of the non-woven fabric can be determined by means of photomicrographic cross sections, for example.

In a preferred embodiment, the non-woven stiffening fabric and the non-woven cover fabric has been consolidated without needle punching and only by means of the addition of chemical binders.

Where the non-woven stiffening or the non-woven cover fabric is formed from at least 2 different non-woven fabrics, these are preferably joined together by mechanical and/or hydrodynamic needle punching. Besides this method, the different non-woven layers can also be laminated by means of a calander.

In a preferred embodiment of the invention, the non-woven stiffening fabric layer, particularly however the non-woven cover fabric layer consists of 2 to 6 non-woven plies, the overall weight per unit area mentioned at the beginning being complied with. Where the non-woven covering layer has a multi-ply structure, at least two of the non-woven layers, preferably at least three of the non-woven layers, are different.

The individual titre of the fibers of synthetic polymers, which form the non-woven stiffening, is between 2 and 25 dtex, preferably between 2 and 17 dtex.

The individual titer of the fibers of synthetic polymers, which form the non-woven cover fabric, is between 2 and 25 dtex, preferably between 2 and 17 dtex, particularly preferably between 2 and 10 dtex.

The non-woven stiffening fabric in the filter according to the invention has an air permeability of at least 750 $l/m^2$ sec. Preferably, the non-woven stiffening fabric has an air permeability between 7,000 and 11,000 $l/m^2$ sec, measured in each case according to DIN EN ISO 9237.

The non-woven cover layer in the filter according to the invention has an air permeability of at least 2500 $l/m^2$ sec, preferably an air permeability of more than 8500 $l/m^2$ sec, measured according to DIN EN ISO 9237.

The cover layer shows a separation behavior according to the Classes G1 to G4 (classification according to EN 779)

Filtration Layer (Layer 3)

The filtration layer applied on the textile stiffening layer consists of glass fibers. Instead of the glass fibers, mineral fibers based on alumino silicate, ceramic, dolomite fibers or fibers of vulcanites, such as e.g. basalt diabase, melaphyre diabase (greenstone) and melaphyres (so-called paleobasalts) can also be used. Glass fibers are used on account of their economic availability.

In the case of the non-woven glass fiber fabrics used according to the invention, the glass fibers used are not subject to any substantial restriction with regard to the type of glass, so that in principle all types of glass such as E glass, S glass, R glass, and C glass may be used. For economic reasons E glass or C glass is preferred. Biosoluble glasses are particularly preferred.

The non-woven glass fiber fabric may be formed from filaments, that is to say fibers of infinite length or from staple fibers. The average length of the staple fibers is between 0.3 and 100 mm, preferably 0.3 to 0.6 mm.

The non-woven glass fiber fabrics may be manufactured by known wet or dry laying methods. Particularly preferably, the non-woven glass fiber fabric is most preferably produced by the air media method (pot and marble method, see U.S. Pat. No. 5,993,501). The average diameter of the mineral and glass fibers produced in this way is between 0.5 and 2.0 µm, preferably between 0.96 and 1.5 µm. The non-woven glass fiber fabric is subjected to chemical binders during or after formation.

The weight per unit area of the non-woven glass fiber fabric is between 25 and 300 g/m², preferably 35 and 100 g/m², particularly preferably between 35 and 80 g/m². Depending on the requirement profile, it is also possible to form the interior of the non-woven glass fiber fabric from various plies.

The non-woven glass fiber fabric contains between 5 and 30% by weight of chemical binders.

Preferably, the thickness of the non-woven glass fiber fabric is between 1 and 20 mm, preferably between 4 and 7 mm.

The thickness of the glass fibers is between 0.5 and 2.0 µm, preferably between 0.96 and 1.5 µm.

The non-woven glass fiber fabric shows a separation behavior according to the Classes F7 to F9 (classification according to EN 779)

Filtration Layer (Layer 2)

The further filtration layer applied on the first filtration layer consists of glass fibers. Instead of the glass fibers, mineral fibers based on alumino silicate, ceramic, dolomite fibers or fibers of vulcanites, such as e.g. basalt diabase, melaphyre diabase (greenstone) and melaphyres (so-called paleobasalts) can also be used. Glass fibers are used on account of their economic availability.

In the case of the non-woven glass fiber fabrics used according to the invention, the glass fibers used are not subject to any substantial restriction with regard to the type of glass, so that in principle all types of glass such as E glass, S glass, R glass, and C glass may be used. For economic reasons E glass or C glass is preferred. Biosoluble glasses are particularly preferred.

The non-woven glass fiber fabric may be formed from filaments, that is to say fibers of infinite length or from staple fibers. The average length of the staple fibers is between 0.3 and 100 mm, preferably 0.3 to 0.6 mm.

The non-woven glass fiber fabrics may be manufactured by known wet or dry laying methods. Particularly preferably, the non-woven glass fiber fabric is most preferably produced by the air media method (pot and marble method, see U.S. Pat. No. 5,993,501). The average diameter of the mineral and glass fibers produced in this way is between 2.0 and 5.5 µm, preferably between 2.0 and 2.7 µm. The non-woven glass fiber fabric is subjected to chemical binders during or after formation.

The weight per unit area of the non-woven glass fiber fabric is between 40 and 300 g/m², preferably between 45 and 80 g/m². Depending on the requirement profile, it is also possible to form the interior of the non-woven glass fiber fabric from various plies. Preferably, the weight per unit area of the further non-woven glass fiber fabric is larger than the weight per unit area of the non-woven glass fiber fabric which is in contact with the textile stiffening layer.

The non-woven glass fiber fabric contains between 5 and 30% by weight of chemical binders.

Preferably, the thickness of the non-woven glass fiber fabric is between 1 and 10 mm, preferably between 4 and 8 mm.

The thickness of the glass fibers is between 2.0 and 5.5 µm, preferably between 2.0 and 2.7 µm.

Preferably, the thickness of the glass fibers of the further non-woven glass fiber fabric is larger than the thickness of the glass fibers of the non-woven glass fiber fabric which is in contact with the textile stiffening layer.

The non-woven glass fiber fabric shows a separation behavior according to the Classes M5 to M6 (classification according to EN 779)

The filter according to the invention is manufactured by known methods available to the person skilled in the art. Suitable methods, for example, are set forth in U.S. Pat. No. 5,993,501; the formation of spinbonded fabrics will likewise be a matter of general knowledge to the person skilled in the art.

The production of the filter takes place by forming the textile stiffening layer (layer 4) or supplying the already formed textile stiffening layer (layer 4). The textile stiffening layer is preferably present as rolled goods. Subsequently the first filtration layer (layer 3) is applied on this textile stiffening layer. This usually takes place directly on the textile stiffening layer (layer 4) by means of the air media methods. A chemical binder is applied at the same time as the glass fibers, conventionally by means of spraying methods.

Preferably, the applied chemical binder is at least partially cured so that a consolidation is effected. Subsequently, the textile stiffening layer (layer 4) loaded with the first filtration layer (layer 3) can be wound up or processed further.

The preferred regions for the materials involved have already been mentioned at the beginning and also apply likewise for the method.

To apply the further filtration layer (layer 2), the textile stiffening layer (layer 4) loaded with the first filtration layer (layer 3) is unwound and supplied directly during the production. Subsequently, the further filtration layer (layer 2) and the textile cover layer (layer 1) is applied on the first filtration layer (layer 3). This usually takes place directly on the first filtration layer (layer 3) by means of air media methods. A chemical binder is applied at the same time as the glass fibers, conventionally by means of spraying methods. Preferably, the applied chemical binder is at least partially cured so that a consolidation is effected. Subsequently, the composite of first filtration layer (layer 3) and textile stiffening layer (layer 4) provided with the further filtration layer (layer 2) and textile cover layer (layer 1) can be wound up or processed further.

The preferred regions for the materials involved have already been mentioned at the beginning and also apply likewise for the method.

For fine adjustment and final consolidation, the entire composite is connected in a calendering oven or calendering dryer, made up of stiffening layer (layer 4), first filtration layer (layer 3), further filtration layer (layer 2) and textile cover layer (layer 1), the chemical binder being cured completely.

In a variant, the production of the filter takes place by forming the textile stiffening layer (layer 4) or supplying the already formed textile stiffening layer (layer 4). The textile stiffening layer is preferably present as rolled goods. Subsequently the first filtration layer (layer 3) is applied on this textile stiffening layer. This usually takes place directly on the textile stiffening layer (layer 4) by means of the air media methods. A chemical binder is applied at the same time as the glass fibers, conventionally by means of spraying methods.

Preferably, the applied chemical binder is at least partially cured so that a consolidation is effected. Subsequently, the textile stiffening layer (layer 4) loaded with the first filtration layer (layer 3) can be wound up or processed further.

The preferred regions for the materials involved have already been mentioned at the beginning and also apply likewise for the method.

To apply the further filtration layer (layer 2), this is formed on the textile cover layer (layer 1). To this end, the textile cover layer (layer 1) is formed or the already formed textile cover layer (layer 1) is supplied. The textile cover layer is preferably present as rolled goods. Subsequently the further filtration layer (layer 2) is applied on this textile cover layer. This usually takes place directly on the textile cover layer (layer 1) by means of air media methods. A chemical binder is applied at the same time as the glass fibers, conventionally by means of spraying methods.

Preferably, the applied chemical binder is at least partially cured so that a consolidation is effected. Subsequently, the textile cover layer (layer 1) loaded with the further filtration layer (layer 2) can be wound up or processed further.

The preferred regions for the materials involved have already been mentioned at the beginning and also apply likewise for the method.

Subsequently, the semi-finished products made up of textile cover layer (layer 1) and the further filtration layer (layer 2) and also made up of textile stiffening layer (layer 4) and the first filtration layer (layer 3) are connected.

Subsequently, the entire composite is subjected to a final consolidation in an oven or dryer, if appropriate with the aid of a calender, the chemical binder curing completely.

For the fine adjustment of filter properties, the entire composite of stiffening layer (layer 4), first filtration layer (layer 3), further filtration layer (layer 2) and textile cover layer (layer 1) is calendered.

The filters according to the invention are used in air/gas and liquid filtration, particularly in the motor vehicle industry, in air conditioning systems, passenger compartment filters, pollen filters, clean room filters, domestic filters, and as oil filters and hydraulic filters.

The object of the present invention are therefore also filter modules and cartridges, which contain the filter according to the invention. Here the filters are fitted in pleated form in housings or other enclosures. Appropriate designs are set forth in U.S. Pat. No. 5,883,501.

Further fields of use of the filter according to the invention are installation and sound-absorption panels.

The invention claimed is:

1. A filter composed of a multi-ply filter medium comprising:
   at least one non-woven textile stiffening layer comprising polymer fibers, the polymer fibers comprising at least about 85 mole % of polyethylene terephthalate, wherein:
      the textile stiffening layer has a weight per unit area of 10 to 300 g/m2,
      the fibers of the textile stiffening layer have a titer in the range of 2 to 25 dtex for polymer fibers or a diameter of 0.5-15 μm for glass fibers,
      the fibers of the textile stiffening layer are bonded using chemical binders or thermoplastic binders, and
      the textile stiffening layer has an air permeability of at least 750l/m2 sec,
   at least one filtration layer, which is attached to at least one side of the non-woven stiffening, the filtration layer being made up of glass fibers, wherein:
      the filtration layer made up of glass fibers comprises a non-woven fabric, a weight per unit area of which is between 25 and 300 g/m2,
      the glass fibers have a diameter of 0.5 μm to 2.0 μm,
      the non-woven fabric of the at least one filtration layer comprises a thickness of between 4 and 7 mm,
      the glass fibers of the filtration layer are bonded using chemical binders, and
      a quantity of the chemical binder applied is 5 to 20% by weight with respect to the weight per unit area of the filtration layer,
   at least one further filtration layer, which is applied on the filtration layer, the at least one further filtration layer being made up of glass fibers, wherein:
      the further filtration layer made up of glass fibers comprises a non-woven fabric, a weight per unit area of which is between 40 and 300 g/m2,
      the glass fibers of the at least one further filtration layer have a diameter of 2.0 μm to 5.5 μm,
      the non-woven fabric of the at least one further filtration layer comprises a thickness of between 4 and 8 mm,
      the glass fibers of the at least one further filtration layer are bonded using chemical binders, and
      a quantity of the chemical binder applied is 5 to 20% by weight with respect to the weight per unit area of the at least one further filtration layer, and
   at least one textile cover layer, which is applied on the at least one further filtration layer, the cover layer being made up of synthetic polymer fibers, wherein
      one or both of the at least one non-woven textile stiffening layer and the at least one textile cover layer comprises an embossed pattern comprising a plurality of embossing elements having an area of between about 0.2 mm$^2$ and 4 mm$^2$,
      the textile cover layer has a weight per unit area of 20 to 100 g/m2,
      the fibers of the textile cover layer have a titer in the range of 2 to 25 dtex,
      the fibers of the textile cover layer are bonded using chemical binders or thermoplastic binders,
      the quantity of the chemical binder or thermoplastic binder applied is 5 to 25% by weight with respect to the weight per unit area of the filtration layer, and
      the textile cover layer has an air permeability of at least 2500l/m2 sec.

2. The filter according to claim 1, wherein the textile stiffening layer is pleatable.

3. The filter according to claim 1, wherein one or both of the textile stiffening layer or the textile cover layer is a wet-laid non-woven fabric, a spunbound fabric or a dry-laid non-woven fabric.

4. The filter according to claim 3, wherein the textile stiffening layer and the textile cover layer each comprise one or more of staple fiber non-woven fabrics or spunbound non-woven fabrics.

5. The filter according to claim 3, wherein one or both of the textile stiffening layer or the textile cover layer is formed from thermoplastics.

6. The filter according to claim 1, wherein the textile stiffening layer has a weight per unit area between 20 and 250 g/m2.

7. The filter according to claim 1, wherein the fibers of the textile stiffening layer have a titer in the range of 2 to 17 dtex for polymer fibers or a diameter between about 0.5-15 μm for glass fibers.

8. The filter according to claim 1, wherein the textile cover layer has a weight per unit area of 30 to 45 g/m2.

9. The filter according to claim 1, wherein the fibers of the textile cover layer have a titer in the range of 2 to 17 dtex.

10. The filter according to claim 1, wherein the filtration layer is a non-woven glass fiber fabric, the weight per unit area of which is between 35 and 100 g/m2.

11. The filter according to claim 1, wherein the glass fibers of the filtration layer have a diameter of 0.96 μm to 1.5 μm.

12. The filter according to claim 1, wherein the filtration layer is a non-woven glass fiber fabric, the weight per unit area of which is between 45 and 80 g/m2.

13. The filter according to claim 1, wherein the glass fibers of the filtration layer have a diameter of 2.0 μm to 2.7 μm.

14. The filter according to claim 1, wherein the filtration layers are non-woven glass fabrics.

15. The filter according to claim 1, wherein the fibers of the filtration layers consist of mineral fibers, glass fibers, or both mineral fibers and glass fibers.

16. A method for manufacturing the filter according to claim 1, comprising the following steps:
   a) forming the textile stiffening layer or supplying the already formed textile stiffening layer in the form of rolled goods,
   b) forming the first filtration layer directly on the textile stiffening layer,
   c) rolling up the material obtained in accordance with step b) and unrolling for carrying out step d),
   d) forming the further filtration layer directly on the first filtration layer,
   e) rolling up the material obtained in accordance with step d) and unrolling for carrying out step f),
   f) forming the textile cover layer or supplying the already formed textile cover layer, and
   g) calendering the material obtained in accordance with step f), the calendering causing the embossed pattern to be applied to one or both of the textile cover layer or the textile stiffening layer.

17. The method according to claim 16, wherein the first filtration layer and the further filtration layer comprise glass fibers.

18. The method according to claim 16, wherein during the formation of the first filtration layer and the formation of the further filtration layer, chemical binders are spray applied.

19. A method for manufacturing the filter according to claim 1, comprising the following steps:
   a) forming the textile stiffening layer or supplying the already formed textile stiffening layer in the form of rolled goods,
   b) forming the first filtration layer directly on the textile stiffening layer,
   c) rolling up the material obtained in accordance with step b) and unrolling for carrying out step g),
   d) forming the textile cover layer or supplying the already formed textile cover layer in the form of rolled goods,
   e) forming the further filtration layer directly on the textile cover layer,
   f) rolling up the material obtained in accordance with step e) and unrolling for carrying out step g),
   g) connecting semi-finished products made up of textile cover layer and the further filtration layer and also made up of textile stiffening layer and the first filtration layer, the first filtration layer and the further filtration layer being connected in a planar manner, and
   h) calendering the material obtained in accordance with step g), the calendering causing the embossed pattern to be applied to one or both of the textile cover layer or the textile stiffening layer.

20. A use of the filter defined in claim 1 in filtration of air/gas and liquids.

21. Filter modules including a housing and at least one filter defined in claim 1.

* * * * *